United States Patent [19]
Hallmark

[11] Patent Number: 5,884,796
[45] Date of Patent: Mar. 23, 1999

[54] DUAL INSULATED CONTAINER

[76] Inventor: Milton L Hallmark, 112 Omni Pl., Forest, Va. 24551

[21] Appl. No.: 980,709

[22] Filed: Dec. 1, 1997

[51] Int. Cl.⁶ .................................................. B65D 81/00
[52] U.S. Cl. ................ 220/23.88; 220/4.26; 220/592.27
[58] Field of Search ............................... 220/23.88, 4.26, 220/504, 592.23, 592.27; 215/6

[56] References Cited

U.S. PATENT DOCUMENTS

| | | | |
|---|---|---|---|
| 1,549,269 | 8/1925 | Koree et al. | 220/592.27 X |
| 1,634,569 | 7/1927 | Bray | 220/504 X |
| 2,326,414 | 8/1943 | Thompson | 220/4.26 X |
| 2,611,499 | 9/1952 | Mayer | 215/6 |
| 3,093,238 | 6/1963 | King, III | 220/23.88 X |
| 3,144,152 | 8/1964 | Kopp | 215/6 |
| 4,078,686 | 3/1978 | Karesh | 215/6 |
| 4,444,324 | 4/1984 | Grenell | 220/4.26 X |
| 5,086,926 | 2/1992 | Paige et al. | 220/504 X |
| 5,335,809 | 8/1994 | Toida | 220/23.88 X |
| 5,499,738 | 3/1996 | Burleigh | 220/504 |

*Primary Examiner*—Steven Pollard
*Attorney, Agent, or Firm*—Michael I. Kroll

[57] ABSTRACT

A dual insulated container (10) comprising an elongate housing (12) having a tapered open neck portion (14) and (16) at each end. An intermediate transverse partition (18) divides the interior of the housing (12) into two separate opposed insulated compartments (20) and (22). Two thermos receptacles (24) and (26) are provided. Each thermos receptacle (24) and (26) has an open neck (28) and (30) for holding hot and cold fluids (32) therein. Assemblies (34) and (36) are for retaining each of the thermos receptacles (24) and (26) within each insulated compartment (20) and (22) of the housing (12). Structures (38) and (40) are for sealing both the open neck portions (14) and (16) of the housing (12) in a removable manner, so as to provide access through each of the open necks (28) and (30) of each thermos receptacle (24) and (26), to remove and replace the hot and cold fluids (32).

21 Claims, 5 Drawing Sheets

DUAL INSULATED CONTAINER

BACKGROUND OF THE INVENTION

1. Field of the Invention

The instant invention relates generally to receptacle structures and more specifically it relates to a dual insulated container. The dual insulated container contains two opposed separate thermoses in one unit, which are thermally insulated from each other, so that the thermoses can store hot and cold fluids therein.

2. Description of the Prior Art

Numerous receptacle structures have been provided in prior art. For example U.S. Pat. Nos. 1,634,569 to Bray; 2,611,499 to Mayer; 3,144,152 to Kopp; 4,078,686 to Karesh; 5,086,926 to Paige et al. and 5,499,738 to Burleigh all are illustrative of such prior art. While these units may be suitable for the particular purpose to which they address, they would not be as suitable for the purposes of the present invention as heretofore described.

Bray, Albert

Reversible Ice Cream Can and the Like

U.S. Pat. No. 1,634,569

An ice cream can of the character referred to includes a can body having therein plural compartments. Each compartment has an opening surrounded by a flange-like part of the body. A plurality of taper lugs are around the outside of the flange-like part. A cover has an outer flange adapted to fit down over the flange-like body part and has on its inner face cooperating lug portions adapted to interlock with the lugs on the body part. A gasket in the cover is adapted to fit upon and be wedged down upon the top edge of the body part. The cover has a concave top with a handle portion across the same. A depression formed in the handle portion with overhanging edges, forms a card receiving pocket, substantially as shown and described.

Mayer, Martin E.

Double Container

U.S. Pat. No. 2,611,499

A transparent receptacle for a plurality of substances: comprising a partition extending in substantially horizontal direction across the interior of the receptacle dividing receptacle into two compartments. The partition includes at least two recesses. The recesses being directed in opposed relationship to each other and disposed to extend approximately in the center of the partition. A closable discharge end is for each compartment at either end of the receptacle. A closure has an inner top surface and is adapted to be applied to each discharge end. The respective recess communicating with the respective discharge end of either of the compartments being approximately of such dimension as to receive a volume of air substantially equal to and present within the space defined by the surface of the respective substance and the inner top surface of the respective closure of the respective compartment in a predetermined position of the receptacle.

Kopp, Herman

Individual Divisional Jar for Coffee and Other Food Products

U.S. Pat. No. 3,144,152

A compartment jar comprising a hollow cylindrical body open at both ends and exteriorly threaded on both ends. A transverse wall partition divides the interior of the body into two halves. A plurality of partitions in each half dives the interior of the half into a plurality of compartments. The outer edges of the rims of the body and the outer edges of the partitions form continuous surface areas. A detachable sealing disc seated on the surface areas at each end seals off the compartments. Reverted integral lugs on the disc overly each compartment. Score lines are on each disc adjacent each lug whereby a portion of the disc may be lifted to expose an individual compartment. An internally threaded cap overlies each disc and its associated lugs and is engaged with the adjacent external threads of the body.

Karesh, Myrna M.

Two-Way Jar

U.S. Pat. No. 4,078,686

A two-way jar with removable inserts comprising a cylindrical container divided into a first compartment and a second compartment. The inserts are removably placable in each compartment and separate access means are into each compartment.

Paige, Lawrence E.

Nicholas, Edward L.

Dual Thermos

U.S. Pat. No. 5,086,926

A food carrier comprising longitudinally-aligned and spaced-apart thermos bottles with a supporting storage compartment, bowl and cup. Interengageable annular threads about the bowl, cup, thermos bottles, storage compartment and intermediate spacer ring allow for a single thermos or dual thermos configuration according to the desires of the user. The carrier allows for transport of first and/or second liquids with accompanying utensils, condiments and the like. A cup may accompany either the single thermos configuration or dual thermos configuration according to the desires of the user.

Burleigh, Howard I.

Container for Holding Pressurized Liquids

U.S. Pat. No. 5,499,738

A container for holding consumable substances, having a plurality of closures adapted to restrain the contained substances and dividing walls to divide the container into a plurality of substance-holding compartments. Each compartment being associated with one closure respectively.

SUMMARY OF THE INVENTION

A primary object of the present invention is to provide a dual insulated container that will overcome the shortcomings of the prior art devices.

Another object is to provide a dual insulated container that contains two opposed separate thermoses in one unit which are thermally insulated from each other, so that the thermoses can store hot and cold fluids therein.

An additional object is to provide a dual insulated container that offers convenience and improved utility for a person, such as a trucker, sportsman, an athlete or an everyday worker who wants or needs the flexibility to have hot and cold food and/or beverages at their disposal in one unit.

A further object is to provide a dual insulated container that is simple and easy to use.

A still further object is to provide a dual insulated container that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Figure 1:
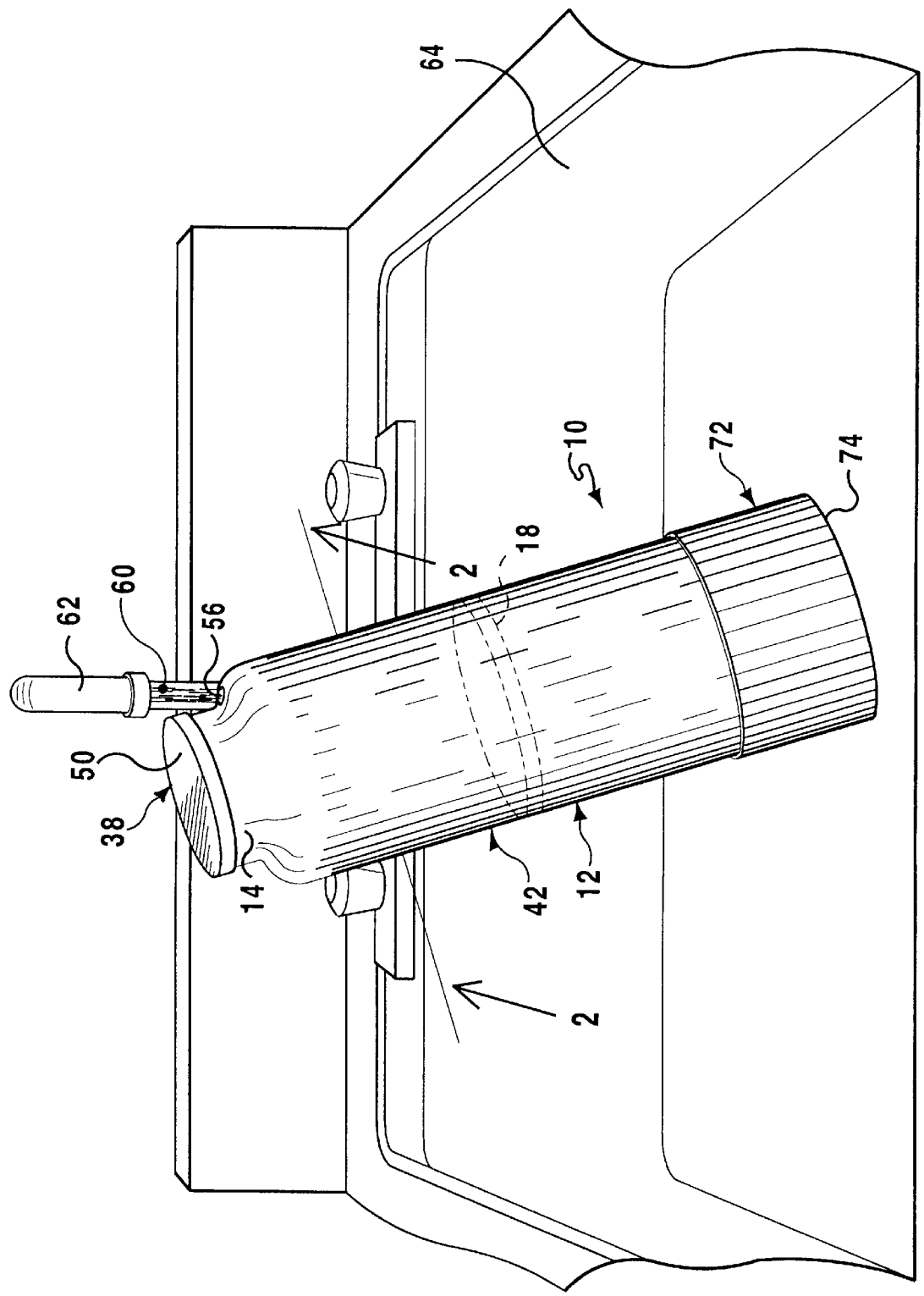
FIG. 1 is a perspective view of a first embodiment of the present invention, showing the first plenum port being filled with hot or cold water from a faucet in a sink.
Figure 2:
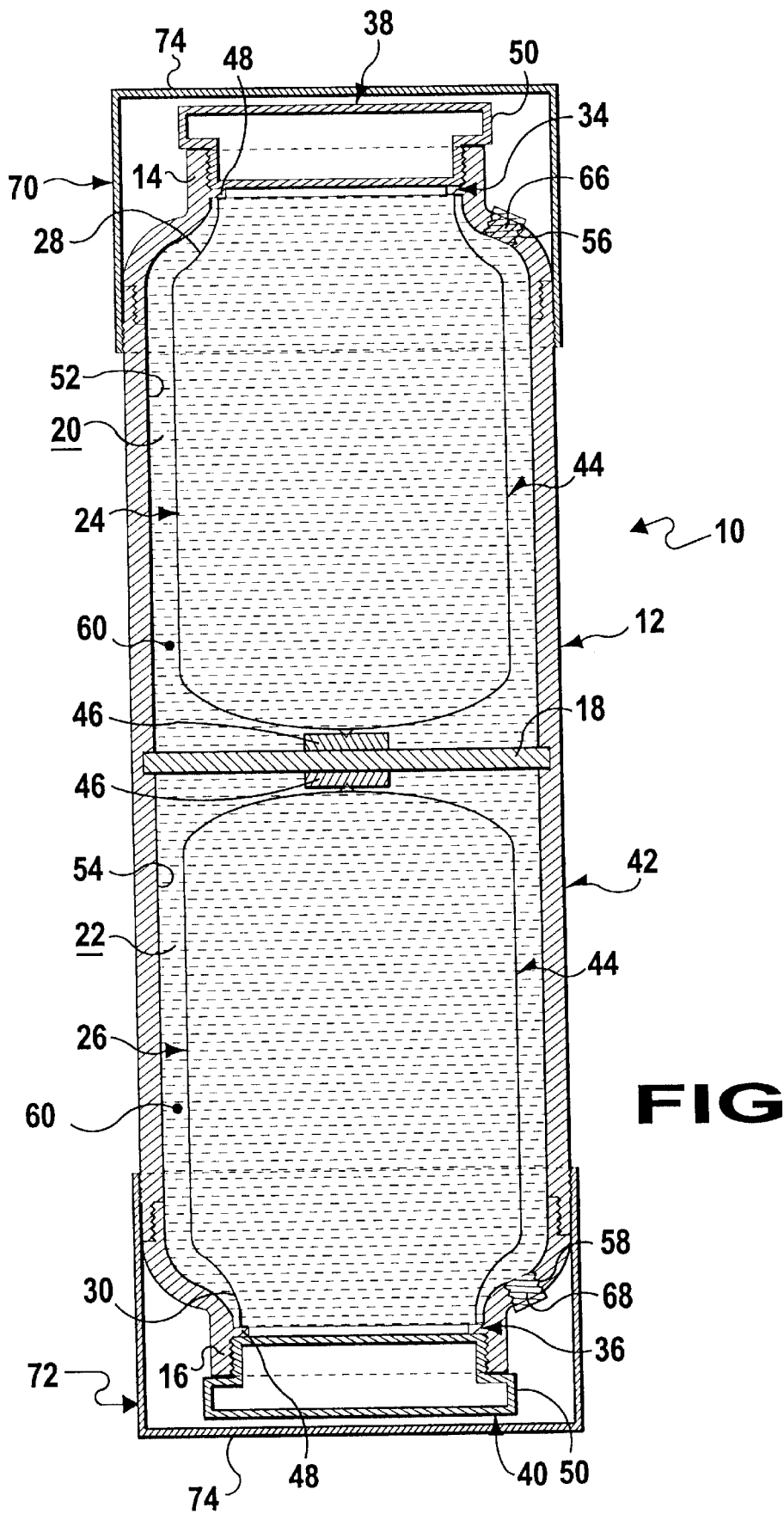
FIG. 2 is an enlarged cross sectional view taken along line 2—2 in FIG. 1 of the first embodiment per se, with the first detachable cup stand installed back in place.
Figure 3:
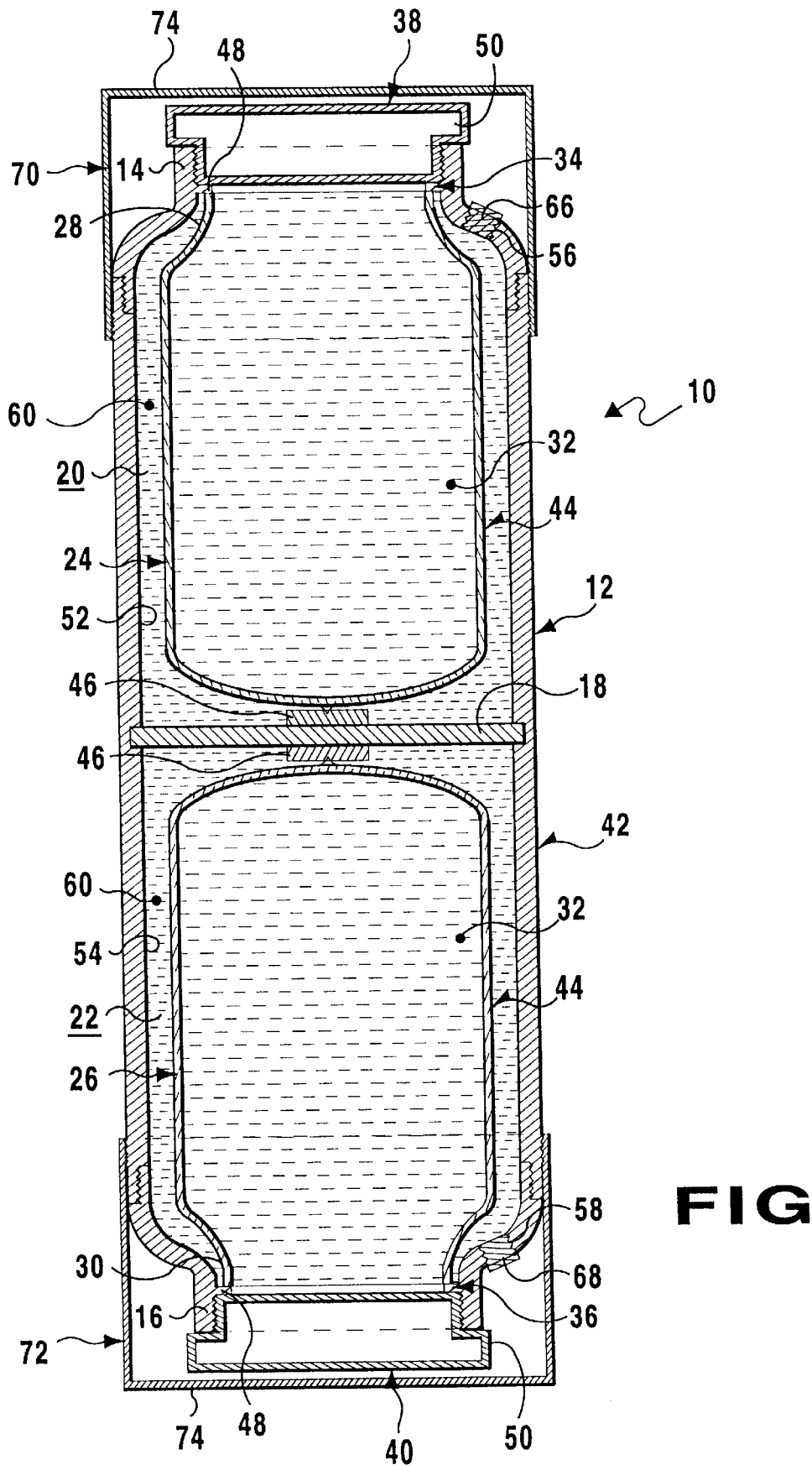
FIG. 3 is a cross sectional view similar to FIG. 2, with the cross section taken completely through the two inner thermos receptacles.

Turning now descriptively to the drawings, in which similar reference characters denote similar elements throughout the several views, FIGS. 1 through 5 illustrate the present invention being a dual insulated container 10. With regard to the reference numerals used, the following numbering is used throughout the various drawing figures.
10 dual insulated container
12 elongate housing of 10
14 first tapered open neck portion of 12
16 second tapered open neck portion of 12
18 intermediate transverse partition of 10
20 first insulated compartment in 12
22 second insulated compartment in 12
24 first thermos receptacle of 10
26 second thermos receptacle of 10
28 open neck of 24
30 open neck of 26
32 hot and cold fluids
34 first retaining assembly of 10
36 second retaining assembly of 10
38 first sealing structure of 10
40 second sealing structure of 10
42 cylindrical body for 12
44 vacuum bottle for 24 and 26
46 seat member of 34 and 36
48 recessed internal flange of 34 and 36
50 one piece closure member for 38 and 40
52 first plenum chamber in 20
54 second plenum chamber in 22
56 first port in 14
58 second port in 16
60 hot and cold water
62 faucet in 64
64 sink
66 first plug for 56
68 second plug for 58
70 first cup stand of 10
72 second cup stand of 10
74 planar end portion of 70 and 72
76 viewing facility of 10
78 first sight glass of 76 in 12
80 second sight glass of 76 in 12
82 first transparent section of 76 in 24
84 second transparent section of 76 in 26

The dual insulated container 10 comprises an elongate housing 12 having a tapered open neck portion 14 and 16 at each end. An intermediate transverse partition 18 divides the interior of the housing 12 into two separate opposed insulated compartments 20 and 22. Two thermos receptacles 24 and 26 are provided. Each thermos receptacle 24 and 26 has an open neck 28 and 30, for holding hot and cold fluids 32 therein. Assemblies 34 and 36 are for retaining each of the thermos receptacles 24 and 26 within each insulated compartment 20 and 22 of the housing 12.

Structures 38 and 40 are for sealing both the open neck portions 14 and 16 of the housing 12 in a removable manner, so as to provide access through each of the open necks 28 and 30 of each thermos receptacle 24 and 26, to remove and replace the hot and cold fluids 32. The elongate housing 12 is a cylindrical body 42. Each thermos receptacle 24 and 26 is a vacuum bottle 44.

Each retaining assembly 34 and 36 includes a seat member 46 affixed centrally onto one side of the intermediate transverse partition 18, to receive a bottom end of one thermos receptacle 24, 26. A recessed internal flange 48 is within one tapered open neck portion 14, 16 of the housing 12 to engage with the open neck 28, 30 of the thermos receptacle 24, 26. Each sealing structure 38 and 40 is a one piece closure member 50 attachable to each open neck portion 14, 16 of the housing 12.

Each thermos receptacle 24, 26 is smaller in diameter than the housing 12. When each thermos receptacle 24, 26 is retained within each insulated compartment 20, 22, a plenum chamber 52, 54 will be formed about each thermos receptacle 24, 26 to provide additional insulation.

Each tapered open neck portion 14, 16 of the housing 12 has a port 56, 58 extending into the plenum chamber 52, 54, so that hot and cold water 60 can be inserted into the plenum chamber 52, 54 through the port 56, 58, to provide still further additional insulation for the thermos receptacle 24, 26 therein. The water 60 can be obtained from a faucet 62 in a sink 64, as shown in FIG. 1.

A pair of plugs 66, 68 are provided. Each plug 66, 68 can be inserted into each port 56, 58 in each tapered open neck portion 14, 16 of the housing 12, to prevent leakage of the hot and cold water 60 from each of the plenum chambers 52, 54.

A pair of cup stands 70, 72 are also provided. Each cup stand 70, 72 has a planar end portion 74 and is detachably connected to the housing 12 over one tapered open neck portion 14, 16 with one sealing structure 38, 40. When one cup stand 70, 72 is attached to the housing 12, the housing 12 can stand upright on the planar end portion 74. When one cup stand 70, 72 is removed from the housing 12, it can be utilized to receive hot and cold fluids 32 from one thermos receptacle 24, 26, when the respective sealing structure 38, 40 is removed therefrom.

Figure 4:
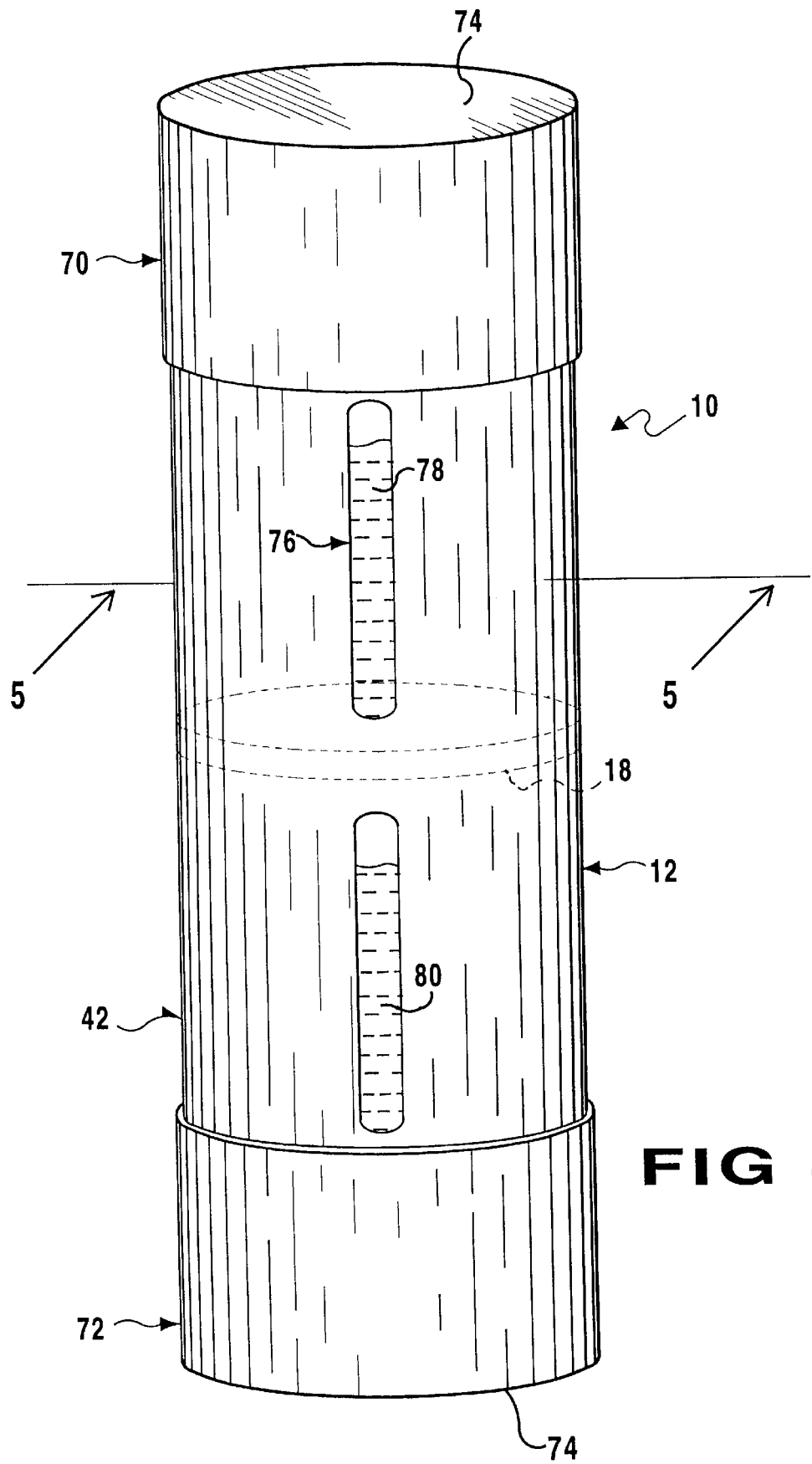
FIG. 4 is a perspective view of a second embodiment of the present invention.
Figure 5:
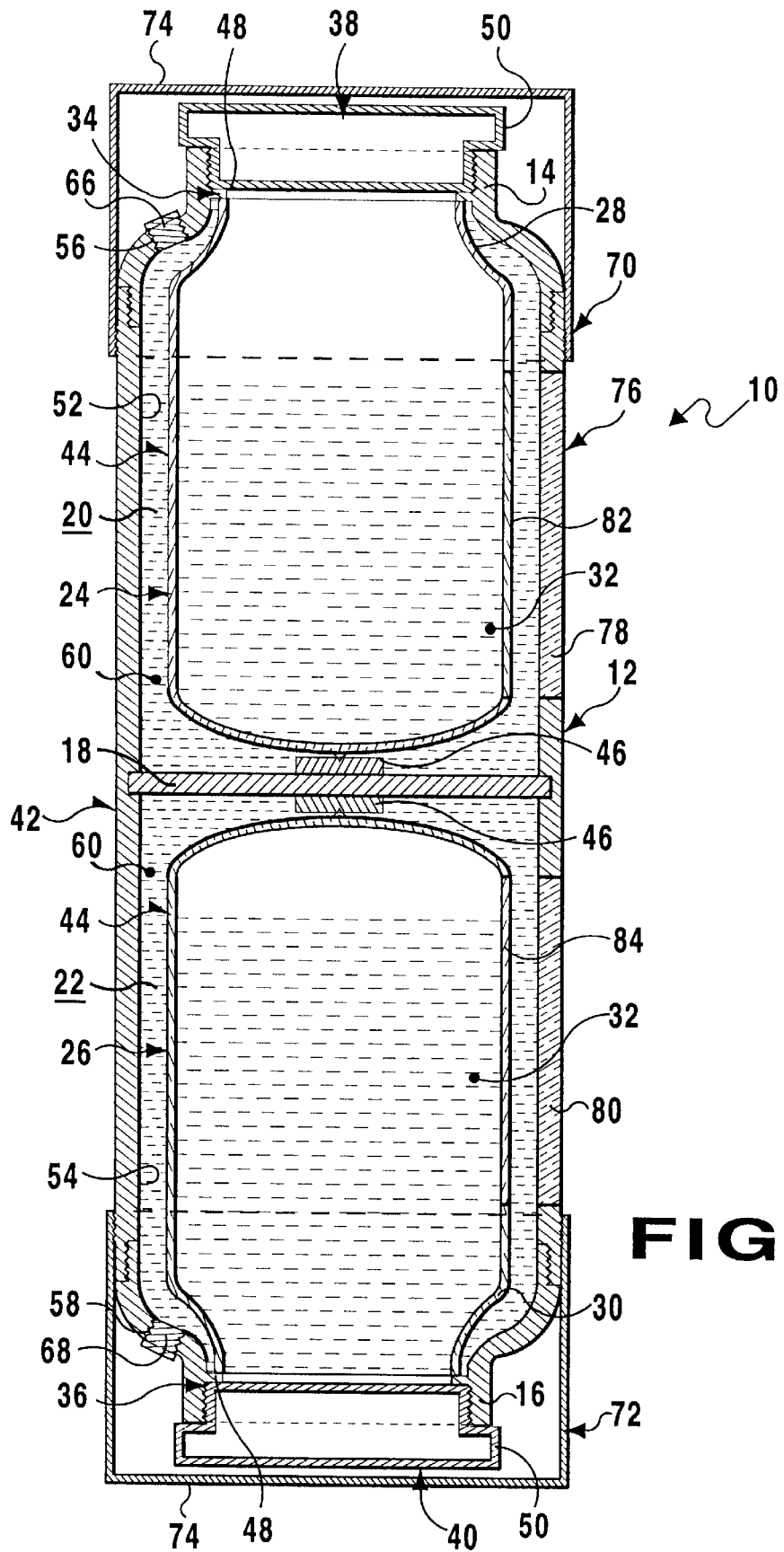
FIG. 5 is a cross sectional view taken along line 5—5 in FIG. 4, completely through the two inner thermos receptacles.

The dual insulated container 10, as shown in FIGS. 4 and 5, further includes a facility 76 for viewing the hot and cold fluids 32 within both of the thermos receptacles 24, 26 in the housing 12. The viewing facility 76 consists of a pair of sight glasses 78, 80 in the housing 12 located in a vertical position above and below the intermediate transverse partition 18. Each thermos receptacle 24, 26 has a transparent section 82, 84 in alignment with one of the sight glasses 78, 80. A person can look through the sight glasses 78, 80 and the transparent sections 84, 86 to visually see the amount of hot and cold fluids 32 within the thermos receptacles 24, 26.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A dual insulated container comprising:
   a) an elongate housing having a tapered open neck portion at each end;
   b) an intermediate transverse partition dividing the interior of said housing into two separate opposed insulated compartments;
   c) two thermos receptacles, wherein each said thermos receptacle has an open neck for holding hot and cold fluids therein;
   d) means for retaining each of said thermos receptacles within each said insulated compartment of said housing; and
   e) means for sealing both said open neck portions of said housing in a removable manner, so as to provide access through each of said open necks of each said thermos receptacle to remove and replace the hot and cold fluids.

2. A dual insulated container as recited in claim 1, wherein said elongate housing is a cylindrical body.

3. A dual insulated container as recited in claim 1, wherein each said thermos receptacle is a vacuum bottle.

4. A dual insulated container as recited in claim 1, wherein each said retaining means includes:
   a) a seat member affixed centrally onto one side of said intermediate transverse partition to receive a bottom end of one said thermos receptacle; and
   b) a recessed internal flange within one said tapered open neck portion of said housing to engage with said open neck of said thermos receptacle.

5. A dual insulated container as recited in claim 1, wherein each said sealing means is a one piece closure member attachable to each open neck portion of said housing.

6. A dual insulated container as recited in claim 1, wherein each said thermos receptacle is smaller in diameter than said housing, so that when each said thermos receptacle is retained within each said insulated compartment, a plenum chamber will be formed about each said thermos receptacle to provide additional insulation.

7. A dual insulated container as recited in claim 6, wherein each said tapered open neck portion of said housing has a port extending into said plenum chamber, so that hot and cold water can be inserted into said plenum chamber through said port, to provide still further additional insulation for said thermos receptacle therein.

8. A dual insulated container as recited in claim 7, further including a pair of plugs, in which each said plug can be inserted into each said port in each said tapered open neck portion of said housing, to prevent leakage of the hot and cold water from each of said plenum chambers.

9. A dual insulated container as recited in claim 1, further including a pair of cup stands, each said cup stand having a planar end portion and is detachably connected to said housing over one said tapered open neck portion with one said sealing means, so that when one said cup stand is attached to said housing, said housing can stand upright on said planar end portion, and when one said cup stand is removed from said housing it can be utilized to receive hot and cold fluids from one said thermos receptacle, when said respective sealing means is removed therefrom.

10. A dual insulated container as recited in claim 1, further including means for viewing the hot and cold fluids within both of said thermos receptacles in said housing.

11. A dual insulated container as recited in claim 10, wherein said viewing means includes:
   a) a pair of sight glasses in said housing located in a vertical position above and below said intermediate transverse partition; and
   b) each said thermos receptacle having a transparent section in alignment with one of said sight glasses, so that a person can look through said sight glasses and said transparent sections to visually see the amount of hot and cold fluids within said thermos receptacles.

12. A dual insulated container comprising:
   a) an elongate housing having a tapered open neck portion at each end, wherein said elongate housing is a cylindrical body;
   b) an intermediate transverse partition dividing the interior of said housing into two separate opposed insulated compartments;
   c) two thermos receptacles, wherein each said thermos receptacle has an open neck for holding hot and cold fluids therein;
   d) means for retaining each of said thermos receptacles within each said insulated compartment of said housing; and
   e) means for sealing both said open neck portions of said housing in a removable manner, so as to provide access through each of said open necks of each said thermos receptacle to remove and replace the hot and cold fluids.

13. A dual insulated container as recited in claim 12, wherein each said thermos receptacle is a vacuum bottle.

14. A dual insulated container as recited in claim 13, wherein each said retaining means includes:
   a) a seat member affixed centrally onto one side of said intermediate transverse partition to receive a bottom end of one said thermos receptacle; and
   b) a recessed internal flange within one said tapered open neck portion of said housing to engage with said open neck of said thermos receptacle.

15. A dual insulated container as recited in claim 14, wherein each said sealing means is a one piece closure member attachable to each open neck portion of said housing.

16. A dual insulated container as recited in claim 15, wherein each said thermos receptacle is smaller in diameter than said housing, so that when each said thermos receptacle is retained within each said insulated compartment, a plenum chamber will be formed about each said thermos receptacle to provide additional insulation.

17. A dual insulated container as recited in claim 16, wherein each said tapered open neck portion of said housing has a port extending into said plenum chamber, so that hot and cold water can be inserted into said plenum chamber through said port, to provide still further additional insulation for said thermos receptacle therein.

18. A dual insulated container as recited in claim 17, further including a pair of plugs, in which each said plug can be inserted into each said port in each said tapered open neck portion of said housing, to prevent leakage of the hot and cold water from each of said plenum chambers.

19. A dual insulated container as recited in claim 18, further including a pair of cup stands, each said cup stand having a planar end portion and is detachably connected to said housing over one said tapered open neck portion with one said sealing means, so that when one said cup stand is attached to said housing, said housing can stand upright on said planar end portion, and when one said cup stand is removed from said housing it can be utilized to receive hot and cold fluids from one said thermos receptacle, when said respective sealing means is removed therefrom.

20. A dual insulated container as recited in claim 19, further including means for viewing the hot and cold fluids within both of said thermos receptacles in said housing.

21. A dual insulated container as recited in claim 20, wherein said viewing means includes:
   a) a pair of sight glasses in said housing located in a vertical position above and below said intermediate transverse partition; and
   b) each said thermos receptacle having a transparent section in alignment with one of said sight glasses, so that a person can look through said sight glasses and said transparent sections to visually see the amount of hot and cold fluids within said thermos receptacles.

* * * * *